(12) United States Patent
Fehmi et al.

(10) Patent No.: US 7,583,844 B2
(45) Date of Patent: Sep. 1, 2009

(54) METHOD, DEVICE, AND SYSTEM FOR PROCESSING OF STILL IMAGES IN THE COMPRESSED DOMAIN

(75) Inventors: Chebil Fehmi, Irving, TX (US); Islam Asad, Richardson, TX (US)

(73) Assignee: Nokia Corporation, Espoo (FI)

( * ) Notice: Subject to any disclaimer, the term of this patent is extended or adjusted under 35 U.S.C. 154(b) by 740 days.

(21) Appl. No.: 11/077,989

(22) Filed: Mar. 11, 2005

(65) Prior Publication Data

US 2006/0204118 A1    Sep. 14, 2006

(51) Int. Cl.
*G06K 9/36* (2006.01)
(52) U.S. Cl. .......... 382/232; 382/248; 382/276
(58) Field of Classification Search .......... 382/232, 382/276, 248, 166, 260, 299; 370/412
See application file for complete search history.

(56) References Cited

U.S. PATENT DOCUMENTS

| | | | |
|---|---|---|---|
| 5,892,847 A * | 4/1999 | Johnson | 382/232 |
| 6,453,073 B2 * | 9/2002 | Johnson | 382/239 |
| 6,504,494 B1 * | 1/2003 | Dyas et al. | 341/50 |
| 6,535,666 B1 * | 3/2003 | Dogan et al. | 385/31 |
| 6,584,111 B1 * | 6/2003 | Aweya et al. | 370/412 |
| 6,643,406 B1 * | 11/2003 | Hajjahmad et al. | 382/240 |
| 6,697,521 B2 * | 2/2004 | Islam et al. | 382/166 |
| 7,133,952 B2 * | 11/2006 | Grzybowski et al. | 710/260 |
| 7,200,277 B2 * | 4/2007 | Joshi et al. | 382/248 |
| 2002/0003905 A1 | 1/2002 | Sato et al. | |
| 2002/0172418 A1 * | 11/2002 | Hu | 382/166 |
| 2003/0053717 A1 | 3/2003 | Akhan et al. | |
| 2004/0105590 A1 * | 6/2004 | Akimoto et al. | 382/248 |
| 2004/0165789 A1 * | 8/2004 | Ii | 382/299 |
| 2004/0228537 A1 * | 11/2004 | Yeung et al. | 382/239 |
| 2006/0285587 A1 * | 12/2006 | Luo et al. | 375/240.2 |

FOREIGN PATENT DOCUMENTS

| | | |
|---|---|---|
| EP | 1282075 | 2/2003 |
| EP | 1441309 | 7/2004 |

(Continued)

OTHER PUBLICATIONS

Stephane G. Mallet "A Theory for Multiresolution Signal Decomposition: The Wavelet: Representation" Department of Computer and Information Science School of Engineering and Applied Science University of Pennsylvania, May 1987, pp. 1-30.*

(Continued)

*Primary Examiner*—Samir A. Ahmed
*Assistant Examiner*—Mekonen Bekele
(74) *Attorney, Agent, or Firm*—Ware, Fressola, Van Der Sluys & Adolphson LLP

(57) ABSTRACT

The present invention concerns the manipulation and especially the filtering of image data in the compressed domain. A method and a device is provided which allows for manipulating image data in the compressed domain transformed from image data in the spatial domain with the help of a wavelet-based transform algorithm. The advantage of the inventive concept is to accelerate the filtering in time, such that underlying constraints in device computational power, storage, memory, and electrical power consumption are applicable for image manipulation/filtering.

34 Claims, 8 Drawing Sheets

FOREIGN PATENT DOCUMENTS

WO        WO 98/40842    *    9/1998

OTHER PUBLICATIONS

Shih-Chung B. Lo, Huai Li, and Matthew T. Freedman "Optimization of Wavelet Decomposition for Image ompression and Feature Preservation" IEEE Transactions on Medical Imaging, vol. 22, No. 9, Sep. 2003.*

N.M. Hussein Hassan and A. Barriga, "Lineal Image Compression Based on Lukasiewicz's Operators", Springer-Verlag Berlin Heidelberg 2006, pp. 348-354.*

International Preliminary Report on Patentability issued Sep. 12, 2007 in corresponding International Application No. PCT/IB2005/003520 filed Nov. 23, 2005.

* cited by examiner

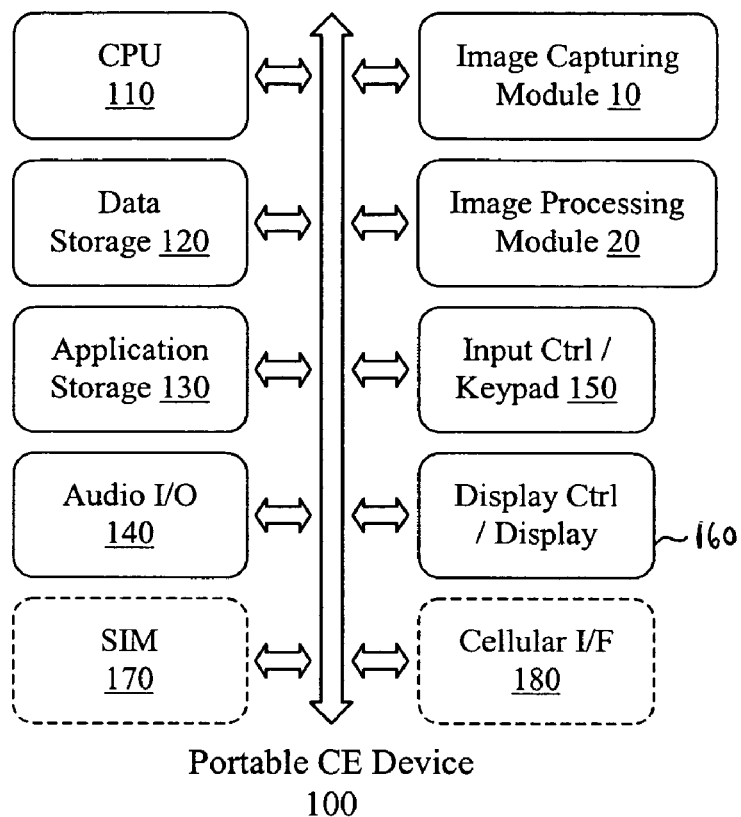
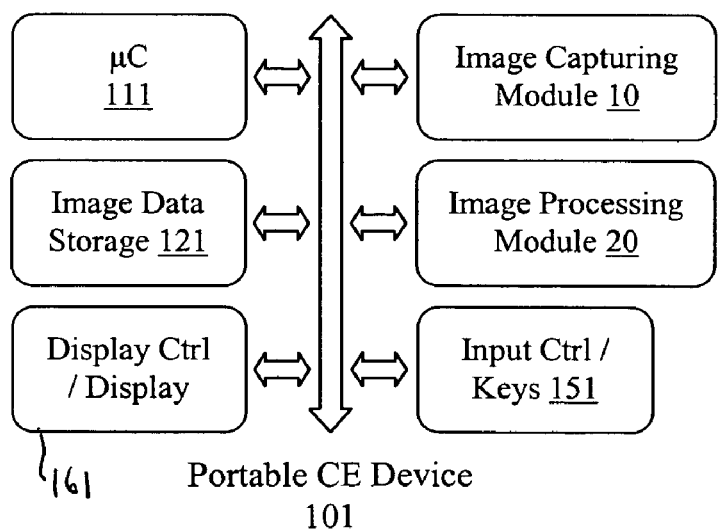
Fig. 1a
Fig. 1b

METHOD, DEVICE, AND SYSTEM FOR PROCESSING OF STILL IMAGES IN THE COMPRESSED DOMAIN

BACKGROUND OF THE INVENTION

The present invention relates to the field of image processing. In particular, the present invention relates to still image processing in the compressed domain.

An increasing number of portable devices feature multimedia applications operating with audio and video. Such multimedia applications are increasingly attracting customers, which enthusiastically enjoy the use of the new multimedia features. Especially the market of portable phones or cellular phones illustrates the rapid acceptance of multimedia featured devices. Imaging phones, i.e. portable phones with image capturing capability, represent a class of portable phones, which are on the best way to represent the standard within a remarkable short period of time since introduction of this product class. The triumphant progress of imaging phones is attended by a comparable success of digital cameras.

Up to now, developments in the field of multimedia applications, especially image capturing applications, address recording/capturing quality, memory requirements, streaming capability (bit rate requirements), and replaying/displaying capability. Correspondingly, most research on multimedia applications has been focused on compression standards, synchronization issues, storage representations, and sensor designs. The field of techniques for processing digital images such as image manipulation including for instance editing (such as brightness adjustment, contrast enhancement, and sharpening), filtering, composing, and special effect implementation, has been paid scant attention.

The scant attention to the field of image processing is based on the complexity, i.e. computational complexity and data volume, required for image processing. Typically, portable devices handle digital images in compressed mode to meet the limitations of such portable devices, especially computational power and storage capacity, as well as requirements resulting from image handling including (wirelessly) receiving/transmitting images, streaming capability etc. Due to the complexity, image processing is a typical task implemented on current workstations and personal computers. These powerful processing devices allow for operating the brute-force algorithms, which include decompressing of the digital image in compressed mode, processing, i.e. manipulating the image in uncompressed domain, and compressing the manipulated image to obtain again finally the manipulated digital image in compressed mode. As aforementioned, modern compression techniques used for image compression are primarily optimized in view of the resulting size of the digital image in compressed mode accepting high computational complexity to obtain compression without degradation of the digital images or with degradation thereof in acceptable limits.

Nevertheless, the increasingly acceptance of multimedia applications will drive the request of the users/customers for image manipulation which are available on today's powerful home computer equipment.

Therefore, there is a need to provide efficient technologies and methodologies for efficient manipulation, editing, and processing of digital images on processing devices with limited processing capability including limited computational capability and limited storage capability. In particular, the technologies and methodologies presented apply user-desired effects, when manipulation, editing and, processing images, such as brightness adjustment, contrast enhancement, filtering, and sharpening on the images.

BRIEF SUMMARY OF THE INVENTION

The object of the present invention is solved by providing technologies and methodologies for digital image processing, in the sense of digital image manipulation and editing, respectively, in the compressed domain to overcome the conventional requirements including decompressing before and re-compressing after digital image processing operations. The main advantage is the significant reduced computational complexity.

In accordance with a first aspect of the present invention, a method for modifying image data in the compressed domain is provided. The compressed image data, i.e. image data in the compressed domain, is obtained from image data in the spatial domain (for instance provided by an image capturing sensor) by means of an encoder utilizing a subband based transform, such as a wavelet transform and in particular the discrete wavelet transform (DWT). A typical encoder, which is assumed to be a future standard, is the JPEG 2000 encoder. An (original) linear function $f(k)$, which may be applicable as a linear filter function, is provided. The linear function $f(k)$ is composed of any linear combination of summands and factors. This means, the linear function $f(k)$ comprises none, one, or more linear offsets $K_j$ and none, one, or more linear scaling factors $\lambda$. The linear function $f(k)$ is provided for being applicable to said image data in the spatial domain to obtain a for instance a function specific filtering effect on the image representation of the image data. The linear function $f(k)$ is transformed into the compressed domain and after that the transformed linear function $F(k)$ is applied to particular subbands of the transformed image data, for instance on the base-band (LL) of said compressed image data or any defined number of subbands thereof.

The application of the transformed linear function $F(k)$ may result in an approximation. It should be noted that the number of subbands of the transformed image selected for application determines the quality of the resulting approximation. The more subbands are selected the closer the application of the transformed linear function $F(k)$ results in a final image representation in correspondence to an image representation obtained by applying the linear function $f(k)$ to the image data in the spatial domain. The differences between both resulting image representations (i.e. obtained by applying the transformed linear function $F(k)$ in the compressed domain and the original function in the spatial domain, respectively) are typically of minor effect such that the application of the transformed linear function $F(k)$ to solely particular subbands and especially to the base-band (LL) of said compressed image data represents a good approximation with the advantage of a high computational speed. Those skilled in the art will appreciate that the base-band (LL subband) represents resolution reduced, uncompressed image data (corresponding to image data in the spatial domain) supporting the resultant short computational processing time.

In accordance with a second aspect of the present invention, a computer program product for modifying image data in the compressed domain is provided. The computer program product comprises a computer readable medium having a program logic recorded thereon which includes code sections comprising instructions for being executed by a processing device. An (original) linear function $f(k)$ is provided. The linear function $f(k)$ is composed of any linear combination of summands and factors. This means, the linear function $f(k)$ comprises none, one or more linear offsets $K_j$ and none, one or more linear scaling factors λ. The linear function f(k) is provided for being applicable to said image data in the spatial domain to obtain a function specific filtering effect on the image representation of the image data. A code section enables the transforming of the linear function f(k) into compressed domain resulting in a transformed linear function F(k). A further code section is adapted to apply said transformed linear function F(k) to a particular predefined number of subbands of the compressed image data, in particular on the base-band (LL) of the compressed image data.

In accordance with a third aspect of the present invention, a Consumer Electronics (CE) device with image capturing capability is provided. For image data handling the device comprises an encoder utilizing a subband based transform, such as a wavelet transform, in particular the discrete wavelet transform (DWT) and more particularly a JPEG 2000 codec. The encoder enables transformation of image data in the spatial domain to image data in the compressed domain enabling the saving of storage volume in contrast to raw image data storing. The imaging device comprises a linear function f(k). The linear function f(k) is composed of any linear combination of summands and factors. This means, the linear function f(k) comprises none, one, or more linear offsets K and none, one, or more linear scaling factors λ. The linear function f(k) is provided for being applicable to said image data in the spatial domain to obtain for instance a function specific filtering effect on the image representation of the image data. An image manipulation module adapted to transform the linear function f(k) into the compressed domain resulting in a transformed linear function F(k). Furthermore, the image manipulation module enables the application of the transformed linear function F(k) to particular subbands of the compressed image data, for instance on the base-band (LL) of the compressed image data.

BRIEF DESCRIPTION OF THE DRAWINGS

Other and further aspects of the present invention will become apparent during the course of the following description and by reference to the attached drawings, in which FIG. 1a illustrates schematically a first exemplary portable Consumer Electronics (CE) device with image capturing capability according to an embodiment of the present invention;

FIG. 1b illustrates schematically a second exemplary portable CE device with image capturing capability according to an embodiment of the present invention;

DETAILED DESCRIPTION OF THE INVENTION

Figure 2:
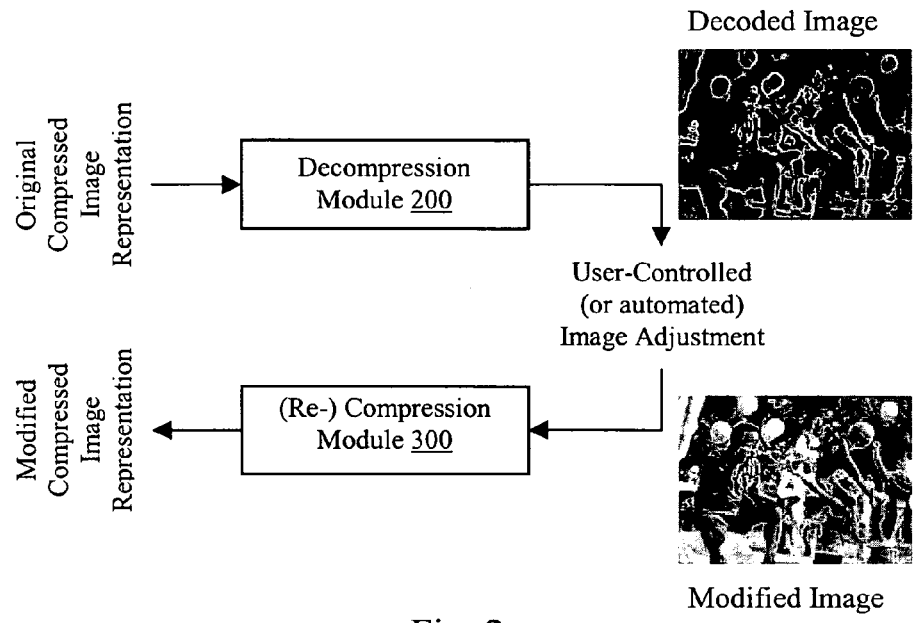
FIG. 2 illustrates a typical simple state of the art image modification operation.

In the following description of the various embodiments, reference is made to the accompanying drawings which form a part thereof, and in which is shown by way of illustration various embodiments in which the invention may be practiced. It is to be understood that other embodiments may be utilized and structural and functional modifications may be made without departing from the scope of the invention. Wherever possible the same reference numbers are used throughout the drawings and description to refer to similar or like parts.

The block diagram of FIG. 1a illustrates principle structural components of a portable consumer electronic (CE) device 100, which should exemplarily represent any kind of portable consumer electronic (CE) device employable with the present invention. It should be understood that the present invention is neither limited to the illustrated CE device 100 nor to any other specific kind of portable CE device.

The illustrated portable CE device 100 is exemplarily carried out as a camera phone, which designates typically a cellular phone with image capturing capability by the means of an image capturing sensor. In particular, the device 100 is embodied as a processor-based or micro-controller based device comprising a central processing unit (CPU) 110, a data storage 120, an application storage 130, cellular communication means including cellular radio frequency interface (I/F) 180 with radio frequency antenna (not shown) and subscriber identification module (SIM) 170, user interface input/output means including audio input/output (I/O) means 140 (typically microphone and loudspeaker), keys, keypad and/or keyboard with key input controller (Ctrl) 150 and a display with display controller (Ctrl) 160, an image capturing sensor 10 including typically a CCD (charge-coupled device) sensor (not shown) with optics (not shown) for image projection, and an image processing module 20 representing exemplarily an implementation of several dependent and independent modules and components required for image handling.

The operation of the CE device 100 is controlled by the central processing unit (CPU) 110 typically on the basis of an operating system or basic controlling application controlling the features and functionality of the CE device by offering their usage to the user thereof. The display and display controller (Ctrl) 160 are controlled by the central processing unit (CPU) 110 and provides information for the user. The keypad and keypad controller (Ctrl) 150 are provided to allow the user to input information. The information input via the keypad is supplied by the keypad controller (Ctrl) to the central processing unit (CPU) 110, which may be instructed and/or controlled in accordance with the input information. The audio input/output (I/O) means 140 includes at least a speaker for reproducing an audio signal and a microphone for recording an audio signal. The central processing unit (CPU) 110 may control the conversion of audio data to audio output signals and the conversion of audio input signals into audio data, where for instance the audio data have a suitable format for transmission and storing. The audio signal conversion of digital audio to audio signals and vice versa is conventionally supported by digital-to-analog and analog-to-digital circuitry.

Additionally, the portable CE device 100 according to a specific embodiment illustrated in FIG. 1a includes optionally the cellular interface (I/F) 180 coupled to the radio frequency antenna and is operable with the subscriber identification module (SIM) 170. The cellular interface (I/F) 180 is arranged as a cellular transceiver to receive signals from the cellular antenna, decodes the signals, demodulates them and also reduces them to the base band frequency. The cellular interface 180 provides for an over-the-air interface, which serves in conjunction with the subscriber identification module (SIM) 170 for cellular communications with a corresponding base station (BS) of a radio access network (RAN) of a public land mobile network (PLMN). The output of the cellular interface (I/F) 180 thus consists of a stream of data that may require further processing by the central processing unit (CPU) 110. The cellular interface (I/F) 180 arranged as a cellular transceiver is also adapted to receive data from the central processing unit (CPU) 110, which is to be transmitted via the over-the-air interface to the base station (BS of the radio access network (RAN). Therefore, the cellular interface (I/F) 180 encodes, modulates and up converts the data embodying signals to the radio frequency, which is to be used. The cellular antenna then transmits the resulting radio frequency signals to the corresponding base station (BS) of the radio access network (RAN) of the public land mobile network (PLMN).

The image capturing sensor 10 is typically implemented by means of a CCD (charge-coupled device) and optics. Charge-coupled devices containing grids of pixels are used for digital image capturing in digital cameras, digital optical scanners, and digital video cameras as light-sensing devices. An image is projected by optics (a lens or an arrangement of one or more lenses) on the capacitor array (CCD), causing each capacitor to accumulate an electric charge proportional to the light intensity at that location. A two-dimensional array, used in digital video and digital still cameras, captures the whole image or a rectangular portion of it. Once the array has been exposed to the image, a control circuit causes each capacitor to transfer its contents to its neighbor. The last capacitor in the array dumps its charge into an amplifier that converts the charge into a voltage. By repeating this process, the control circuit converts the entire contents of the array to a varying voltage, which it samples, digitizes, and provides the raw image data for further handling by the image processing module 20. The image processing module 20 enables the user of the CE device 100 to shoot still digital images and eventually also video sequences. Conventionally, the raw image data is compressed by the image processing module 20 and stored in the data storage. The image processing module 20 implements among others the codecs, i.e. coding and encoding modules required for still digital image processing (and video processing), where the implemented components of the image processing module 20 are preferably software application components, which operation may be supported by specific hardware implementation, which is advantageous to improve processing capability and functionality of the image processing module 20.

Recently CMOS image sensors have become popular and are on the way to generally replace the CCDs for image capturing. The CMOS image sensors can be produced using the CMOS manufacturing process which is the dominant technology for all chip-making, CMOS image sensors are cheap to make and signal conditioning circuitry can be incorporated into the same device. It should be understood that the present invention is not limited to any specific image capturing sensor type.

Typical alternative portable CE devices may include personal digital assistants (PDAs), hand-held computers etc, which may also be equipped with image capturing sensors and have image processing capability. The implementation of those typical micro-processor based CE devices is well known in the art, and implementation details are out of the scope of the present invention.

The block diagram of FIG. 1b illustrates principle structural components of a portable consumer electronic (CE) device 101, which should exemplarily represent any kind of portable consumer electronic (CE) device employable with the present invention.

The illustrated portable CE device 101 is exemplarily carried out as a digital camera enabling the user for digital image capturing. In particular, the device 101 is embodied as microcontroller (μC) based device comprising a micro-controller (μC) 111, a image data storage 121, user interface input/output means including keys coupled to the micro-controller (μC) 111 via a key input controller (Ctrl) 151 and a display with display controller (Ctrl) 161, an image capturing sensor 10 including typically a CCD (charge-coupled device) or CMOS image sensor (not shown) with optics (not shown) for image projection, and an image processing module 20 representing exemplarily an implementation of several dependent and independent modules and components required for image handling. The operation of the CE device 101 is controlled by the micro-controller (μC) 111, which controls the operation of the implemented components. The user is allowed to interact with the CE device 101 by key input, which effects functions of the CE device 101. Conventionally, such CE devices 101 are fixed in their operations in contrast to a processing-based CE device. The implementation of digital cameras is well known in the art, and implementation details are out of the scope of the present invention.

Nevertheless, the implementation of the image capturing sensor 10, either hard-wired or software application based, may offer the same functionality to the user.

The further description will concentrate on the inventive concept, which relates in general to the image processing implemented in the CE devices 100 and 101 (with reference to FIGS. 1a and 1b, implemented in the image processing module 20). In particular, the inventive concept relates to the image manipulation, editing, filtering, etc., which may be operated in accordance with user instruction or which may be also operated autonomously and/or independently.

With reference to FIG. 2, the typical process of the image manipulation, editing, filtering, etc will be illustrated. Assume, an image is provided and the user wished to adjust the image for contrast enhancement. Typical simple image enhancement and/or processing operations, such as brightness adjustment, contrast enhancement or color filtering, require full decoding of the compressed image representation in CE devices 100, application of these operations in the spatial domain, and full re-compressing of the edited/modified image to compressed image representation. For portable CE devices, which are constrained in computational power and memory, such image processing operations can be computationally costly, especially if the images are of high resolution. The provision of computational power and memory also determines the overall design of such portable CE devices in view of weight and size of the portable CE devices as well as electrical power consumption due to computing time, computing load, and module empowerment (in case of module selective activation/deactivation). Likewise, it should be noted that digital camera manufacturer and camera phone manufacturers, producing the typical kind of portable CD devices, to which the present invention relates, are competing to increase the resolution of the images they are taking.

Currently, there are up to 2 Mega pixel sensors in phones and up to 5 Mega pixel sensors for typical digital cameras. These numbers are subject to further increase.

In editing/processing images, users usually adjust the brightness, enhance the contrast, and apply some other filtering operations to enhance the visual quality of the images. As aforementioned, these operations are achieved by decompressing and re-compressing the adjusted digital images that can take up considerable time and power. Assume that compressing a thumbnail sized color digital image may take about 1 unit of time (depending on the computational complexity of the employed compression algorithm and computational power provided by the portable CE device). Increasing the color image size to e.g. VGA (640×480 pixels) results in a corresponding compressing time by about a factor of 4. Simple linear extension of these observations indicates that the encoding time for a 1 Mega pixel color digital image would lead to an increase by more than a factor of 13 (in comparison with the thumbnail sized color digital image). In fact, every 1 Mega pixel increase in image resolution would result in a further increase of the encoding time, depending on the input-output resolution factor.

Figure 3:
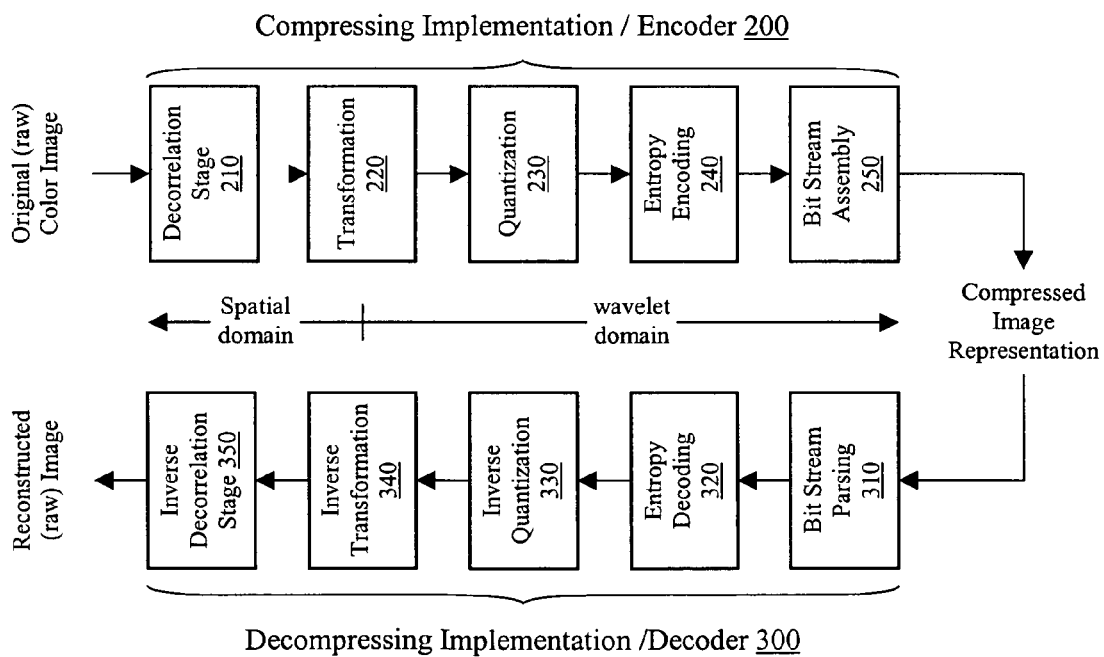
FIG. 3 illustrates schematically operation modules of a wavelet transform encoder and a wavelet transform decoder for still image compression/decompression according to an embodiment of the present invention.

In the following, the JPEG 2000 compression algorithm, which is expected to become the standard compression algorithm in the future due to its superior image compression over JPEG and to its new important features for imaging applications, such as scalability in resolution and in quality. FIG. 3 illustrates schematically JPEG 2000 compression (which may be also designated as encoding) as well as the JPEG 2000 decompression (which may be also designated as decoding).

The operational flow of a typical JPEG 2000 encoder 200 can be gathered from FIG. 3. A first module (not shown) of the encoder 200 preceding in the compressing sequence is a separation module, whose function is to cut the image into manageable chunks required conventionally for huge sized digital images, which are separated into spatially non-overlapping tiles of equal size. Each component is then processed separately. Following, a decorrelation stage module 210 is provided, whose function is to decorrelate the color components of the digital color image. For multi-component images, in particular color images, a component transform is performed to decorrelate the components. For example, a color image with RGB (red, green and blue) components can be transformed to the YCrCb (Luminance, Chrominance red and Chrominance blue) or RCT (reversible component transform) component space. The image data (of the digital image and of the components thereof, respectively) is the supplied to the transformation module 220, which is adapted to transform the image data into the wavelet domain. After transformation, the image data in the wavelet domain is then quantized by the quantization module 230. After that, the quantized coefficients resulting from the quantization operation are regrouped by the entropy encoding module 240 to facilitate localized spatial and resolution access.

Each subband of the quantized coefficients is divided into non-overlapping rectangular blocks. Three spatially co-located rectangles (one from each subband at a given resolution level) form a packet partition. Each packet partition is further divided into code-blocks, each of which is compressed into an embedded bit stream with a recorded rate-distortion curve. The embedded bit stream of the code-blocks is assembled by the bit stream assembler module 250 into packets, each of which represents a quality increment of one resolution level at one spatial location. Finally, a layer is formed by collecting packets from all packet partitions of all resolution levels of all tiles and all components such that the layer that is one quality increment of the entire image is at full resolution. It should be noted that the final JPEG 2000 bit stream may consist of multiple layers.

In analogy, the operational flow of a typical JPEG 2000 decoder 300 can also be gathered from FIG. 3. The decoding and decompressing of JPEG 200 compressed image representation provides modules performing inverse functions concerning the respective module functions described above with reference to the JPEG 2000 encoder 200. The compressed image representation is supplied to a bit stream parsing module 310 separating and/or extracting the components and tiles required and finally the code-blocks included in packets assembled therein. The entropy decoding module 320 is adapted to reverse the regrouping obtained by the entropy encoding module 310.

The inverse quantization module 330 reconstructs the image data in the wavelet domain from the quantized coefficients and the image data in the wavelet domain is supplied to an inverse transformation module 340, which is adapted to perform an inverse wavelet transform resulting in image data in the spatial domain. Then an inverse decorrelation stage module 350 retransforms the decorrelated components. This means, a color image in for instance YCrCb (Luminance, Chrominance red and Chrominance blue) or RCT (reversible component transform) component space is transformed into a color image with RGB (red, green and blue) components. In case of a separation into spatially non-overlapping tiles of equal size due to image size, a final module (not shown) of the decoder 300 succeeding the decorrelation stage module 350 merges the component having been separately processed during decoding.

It should be noted that JPEG 2000 is a standardized image compression algorithm, which has been developed by the Joint Photographic Experts Group (JPEG) and published as ISO/IEC 15444-1:2000 by the International Standards Organization (ISO), which is incorporated by reference herewith for background.

Encoding/compressing in accordance with the JPEG 2000 standard takes about 1.2 times that of decoding/decompressing. For encoding, the following numbers are approximate percentages of time each operation takes (whereby the list does not claim to be exhaustive, i.e. main contributions merely):

Reading image data: ~5%
Color decorrelation (if required): ~5%
Wavelet transform: ~10%
May vary a bit depending on the number of decompositions to do
Entropy coding: 70%
May vary according to the bits per pixel targeted
The JPEG 2000 standard is a bit-plane based encoder
Image quality and computational complexity increase with increasing the number of bit planes to encode
Rate allocation and Bit Stream Assembly: ~10%

For decompressing, the operations require substantially symmetric computational power (whereby the list does not claim to be exhaustive, i.e. main contributions merely):

Bit stream parsing: ~5%
Inverse color decorrelation (if required): ~5%
Inverse wavelet transform: ~10%
May vary a bit depending on the number of decompositions to do
Inverse entropy decoding: ~70%
May vary according to the bits per pixel targeted
The JPEG 2000 standard is a bit-plane based coder
Image quality and computational complexity increase as you increase the number of bit planes to encode and decode, respectively
Writing image data: ~10%.

To increase the performance of the processing operations, we need to avoid re-encoding the image after making modifications of the image content. This basically means avoiding the major contributors in the encoding process, i.e., the entropy coding and decoding processes. As can be seen from the aforementioned enumeration as well as from FIG. 2, performing operations to modify the original image to produce a modified image while significantly gaining in computing time necessitates avoiding as much as possible the entropy coding/decoding part. In view of computational complexity, entropy encoding/decoding is the bottleneck. A signification gain in computational cost can be obtained by avoiding same.

Most existing high performance image encoders in application are transform based coders. The transform decorrelates the pixels and compacts their energy into a small number of coefficients and results in efficient coding of the transform coefficients. Since most of the energy is compacted into a few large transform coefficients, an entropy coding scheme can used to efficiently encode them.

Figure 4:
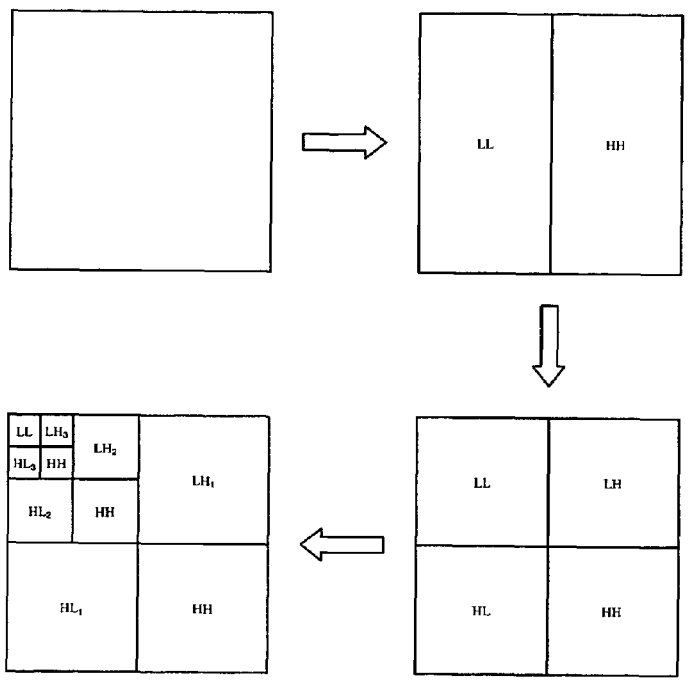
FIG. 4 illustrates schematically a wavelet transform with sub-band division and frequency filtering resulting in a three-level wavelet transform of a digital image.

The wavelet transform operates on the entire image, (or a potion of the image, a tile of a component, in the case of large color image). It offers better energy compaction than for instance discrete cosine transform, and no blocking artifact after coding. Moreover, the wavelet transform decomposes the image into an L-level dyadic wavelet pyramid, as shown in FIG. 4. The resultant wavelet coefficient can be easily scaled in resolution: by not using the wavelet coefficients at the finest M-levels, an image can be reconstructed that is $2^M$ times smaller than the original image. The multi-resolution capability of the wavelet transform lends it ideally to scalable image coding.

Figure 5A:
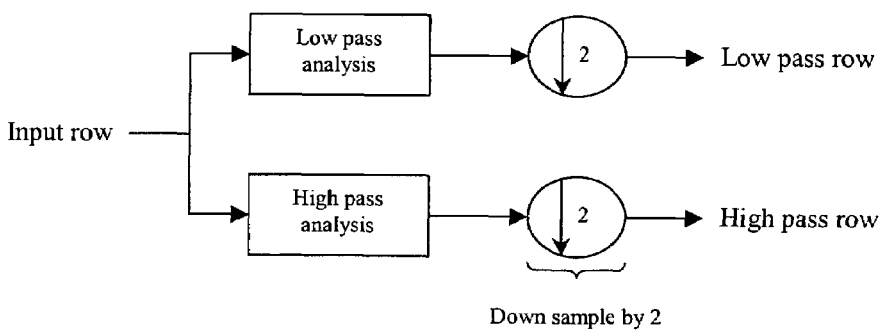
FIG. 5a illustrates schematically an exemplary frequency analysis for the wavelet transform encoder of FIG. 3.
Figure 5B:
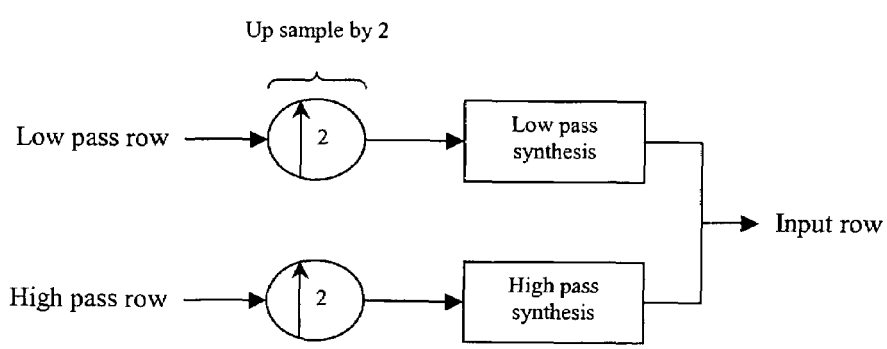
FIG. 5b illustrates schematically an exemplary frequency synthesis for the wavelet transform encoder of FIG. 3.

Wavelet is a signal representation that the low pass coefficients represent slow changing long data segment, and the high pass coefficients represent localized change in short data segment. The framework of a one-dimensional wavelet transform is shown in FIGS. 5a and 5b. An input row can be decomposed through a low and high pass analysis FIR (finite impulse response) filter, and sub sample the filtering result by a factor of 2. To reconstruct the original input row, the low and high pass coefficients are up sampled by a factor of 2 and pass through another low and high pass synthesis FIR filter pair.

The following sections will introduce to the mathematical denotation of manipulation operations to be performed on digital images. For the purpose of notation, the original image is designated as I(n,m) and the resulting manipulated (processed, edited etc.) image is designated as I'(n,m).

Brightness Adjustment—Scalar Addition/Subtraction

In this image manipulation operation, the relation between I(n,m) and I'(n,m) is given by:

$$I'(n,m) = I(n,m) + K \quad (1)$$

Where K ∈ D, a set of integers. For example, a typical digital color images may have an 8-bit luminance representation, where the luminance can have 256 different levels; hence D=[−255,255]. If, in Equation (1), I' (n,m) exceeds the range D, it is clipped to its closest value in D.

Figure 6:
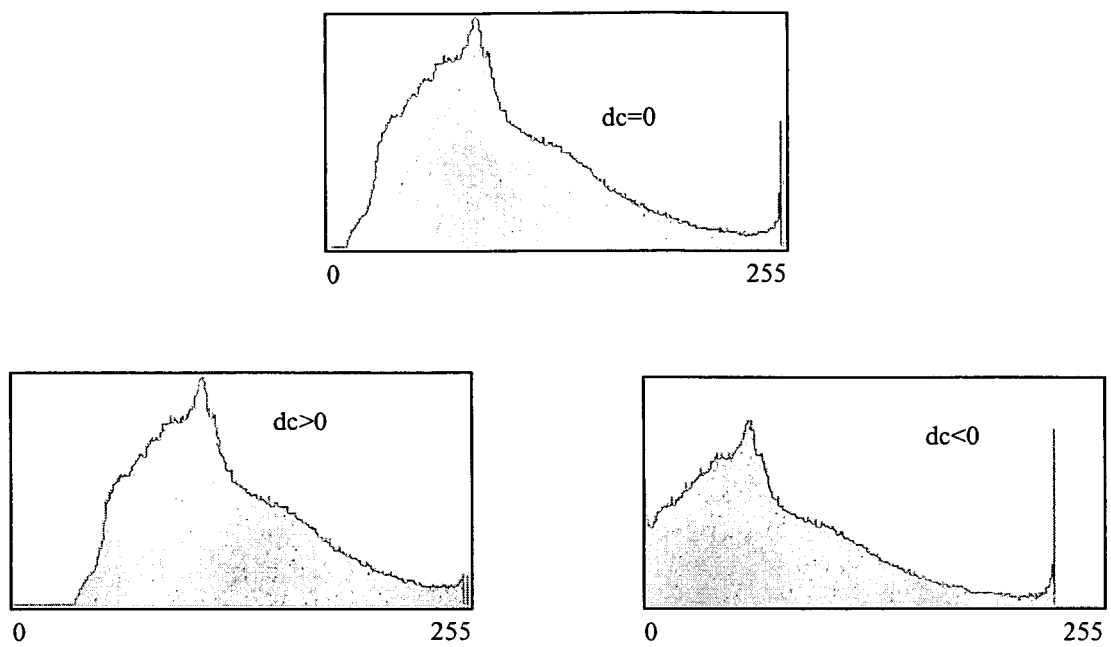
FIG. 6 illustrates schematically shifts in histogram diagrams of an image subjected to brightness adjustments according to an embodiment of the present invention.

The condition K>0 is equivalent to an increase in brightness, thereby making the image brighter, while K<0 is equivalent to a decrease in brightness, thereby making the image darker. The effect of brightness adjustment on a digital image can be seen by looking at the histogram of the image before and after the brightness operation (cf. FIG. 6). The following sections discuss how to apply the brightness operation on digital images in the compressed domain.

To transform the image data of an image in the spatial domain into another more energy compacting domain, the JPEG 2000 standard utilizes the wavelet transform. In the baseline of the standard, the filters allowed are either the 5-3 or the 9-7 wavelet filters; the decomposition type is dyadic (also known as Mallat).

In order to determine the operations required to translate the brightness and contrast operations (of which description is following) from the spatial domain to the wavelet domain (i.e. equal to the designation compressed domain), it is necessary to first understand the transform operation known as discrete wavelet transform (DWT), which should be briefly defined below:

Any continuous function I(t) can be represented by the following expansion, defined in terms of a scaling function and its wavelet derivatives:

$$I(t) = \sum_{k=-\infty}^{\infty} c_{j_0}(k)\varphi_{j_0,k}(t) + \sum_{j=j_0}^{\infty} \sum_{k=-\infty}^{\infty} d_j(k)\psi_{j,k}(t) \quad (2)$$

where, $c_{j_0}(k)$ and $d_j(k)$ are the scaling and wavelet coefficients, respectively, and $\phi_{j_0,k}(t)$ and $\psi_{j,k}(t)$ are the scaling and wavelet functions, respectively. In this expansion, the first summation gives a function representing a low resolution or coarse approximation of I(t) at scale $j_0$. For each increasing j in the second summation, a higher or finer resolution function is added, which adds increasing details. The set of coefficients $c_{j_0}(k)$ and $d_j(k)$ in the above wavelet expansion is called the discrete wavelet transform (DWT) of the function I(t).

The scaling and wavelet coefficients at scale j are related to the scaling coefficients at scale j+1 by the following two relationships:

$$c_j(k) = \sum_m h(m - 2k)c_{j+1}(m) \quad (3)$$

$$d_j(k) = \sum_m h'(m - 2k)c_{j+1}(m) \quad (4)$$

The above equations state that the scaling coefficients at higher scale, along with the scaling and wavelet filters, h(k) and h'(k), respectively, can be used to calculate the wavelet and scaling coefficients or the discrete wavelet transform coefficients, at lower scales.

In practice, a discrete signal at its original resolution is assumed to be the corresponding scaling coefficients. Hence, if j=J is the scale at original resolution, then $$c_J(k) = I(k); j = J \quad (5)$$

The discrete wavelet transform coefficients at the lower scales are obtained using the following set of equations:

$$c_{j-1}(k) = \sum_m h(m-2k)c_j(m); \; j = J, J-1, \ldots, j_0+1 \quad (6)$$

$$d_{j-1}(k) = \sum_m h'(m-2k)c_j(m); \; j = J, J-1, \ldots, j_0+1 \quad (7)$$

Having formulated the DWT of a signal, the brightness adjustment in wavelet domain is applicable. As mentioned above, a brightness operation in the spatial domain corresponds to:

$$I'(k) = I(k) + K_J \quad (8)$$

where the constant $K_J$ signifies the brightness offset applied at level J of the image (original spatial resolution). Using the prime (') symbol to signify the signal that has undergone the brightness operation, the corresponding brightness operation in the wavelet domain at the different scales j, in terms of the scaling and wavelet coefficients (the discrete wavelet transform (DWT) coefficients), is given by:

At scale j=J:
Using equations (5) and (8), $$c_J'(k) = I'(k) = I(k) + K_J = c_J(k) + K_J \quad (9)$$

At scale j=J−1:

$$c'_{J-1}(k) = \sum_m h(m-2k)c'_J(m) \quad (10)$$

$$c'_{J-1}(k) = \sum_m h(m-2k)[c_J(m) + K_J]$$

$$c'_{J-1}(k) = \sum_m h(m-2k)c_J(m) + \sum_m h(m-2k)K_J$$

$$c'_{J-1}(k) = c_{J-1}(k) + K_J \sum_m h(m-2k)$$

$$c'_{J-1}(k) = c_{J-1}(k) + K_{J-1}(k)$$

where $$K_{J-1}(k) = K_J \sum_m h(m-2k)$$

At scale j=J−2:

$$c'_{J-2}(k) = \sum_m h(m-2k)c'_{J-1}(m) \quad (11)$$

$$c'_{J-2}(k) = \sum_m h(m-2k)[c_{J-1}(m) + K_{J-1}(k)]$$

$$c'_{J-2}(k) = \sum_m h(m-2k)c_{J-1}(m) + \sum_m h(m-2k)K_{J-1}(k)$$

$$c'_{J-2}(k) = c_{J-2}(k) + K_{J-1}(k)\sum_m h(m-2k)$$

$$c'_{J-2}(k) = c_{J-2}(k) + K_{J-2}(k)$$

where $$K_{J-2}(k) = K_{J-1}(k)\sum_m h(m-2k) = K_J\left(\sum_m h(m-2k)\right)^2$$

Proceeding in this fashion, for a general scale j=J−l, the scaling coefficients are given by:

$$c'_{J-l}(k) = c_{J-l}(k) + K_{J-l}(k) \quad (12)$$

where $$K_{J-l}(k) = K_J\left(\sum_m h'(m-2k)\right)^l \quad (13)$$

In other words, the brightness operation in the wavelet domain can be performed by adding the term $K_{J-l}(k)$ to the scaling coefficients $c_j(k)$. The term h(k) signifies the scaling filter.

We can do a similar analysis for evaluating the wavelet coefficients $d_j(k)$. For the sake of brevity and avoiding repetitiveness (since the analysis is very similar), we will not list all the steps of the analysis but will only provide the end result. For a general scale, j=J−l, the wavelet coefficients are given by:

$$d'_{J-l}(k) = d_{J-l}(k) + K_{J-l}(k) \quad (14)$$

where $$K_{J-l}(k) = K_J\left(\sum_m h(m-2k)\right)^l \quad (15)$$

In other words, the brightness operation in wavelet domain can be performed by adding the term $K_{J-l}(k)$ to the wavelet coefficients $d_j(k)$. The term h'(k) signifies the wavelet filter.

The term $K_{J-l}(k)$ represents the DC shift in the image in the wavelet domain. The wavelet transformed coefficients change in all the subbands from the original wavelet transformed image. However, since most of the energy is concentrated in the LL subband of the transformed image, it is sufficient to apply this change only in the LL subband to get a first good approximation of the brightness operation in the spatial domain. Thus, the addition (/subtraction) of a DC factor in the spatial domain is approximately equivalent to the addition (/subtraction) of the corresponding DC factor in the base band (LL subband) of the wavelet domain.

Therefore, as a first step, the brightness adjustment in the wavelet domain is applicable instead of applying it in the spatial domain. The gain in performance here is approximately 10 to 15% (due to the fact that the discrete wavelet transform is not that costly as shown above). If a decoding of the other bands is not performed, then the gain is more than 10 times as explained below. The approximate change here occurs in the LL subband only. It is therefore not necessary to re-encode the other sub-bands. The JPEG 2000 standard and other encoders being based on subband encoding and especially wavelet transform (e.g. discrete wavelet transform), which do not use any inter-bands correlation, allow keeping the same code streams for the other bands.

Therefore, the performance can be significantly improved by modifying only the LL subband in the image data in the compressed domain.

Figure 7:
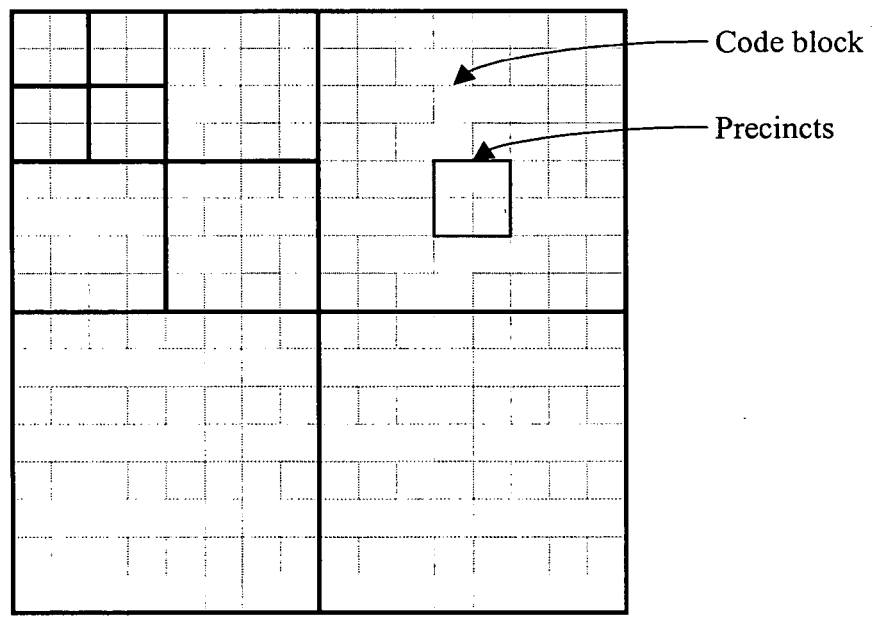
FIG. 7 illustrates schematically three-level wavelet transform of a digital image subdivided into precincts and code blocks.

Note that after quantization, each subband (resulting from the discrete wavelet transform) is divided into rectangular blocks, i.e. non-overlapping rectangles. Three spatially consistent rectangles (one from each subband at each resolution level) comprise a packet partition location or precinct; cf. FIG. 7. Each packet partition location is further divided into non-overlapping rectangles, called "code-blocks", which form the input to the entropy coder which has been described above with reference to FIG. 2. The coded data of each code-block is distributed across one or more layers in the code stream. Each layer successively and monotonically improves the image quality, so that the decoder is able to decode the code block contributions contained in each layer in sequence. The data representing a specific tile, layer, component, resolution and precinct appears in the code stream in a contiguous segment called a packet. Packet data is aligned at 8-bit (one-byte) boundaries. The data in a packet is ordered in such a way that the contribution from the LL, HL, LH, and HH subbands appear in that order. Within each subband, the code-block contributions appear in raster order, confined to the bounds established by the relevant precinct. Only those code-blocks that contain samples from the relevant subbands, confined to the precinct, are represented in the packet.

Assume a digital image with a resolution of 1280×960 pixels, which is equivalent to 1.2 Mega pixels. Decomposing this image in 5 levels will lead to sub-bands of sizes in pixels: 640×480, 320×240, 160×120, 80×60, and 40×30. In case the code blocks utilized to compress this image are 32×32 pixels (most commonly used block size), the number of code-blocks in this image will be 1200 blocks. The blocks in the LL subband are only 4. In case only those 4 blocks are modified and the rest is kept without modification, then only 0.33% (=4/1200) of the entropy coded block data has to be changed. When omitting the image reading operation, the color transform operation, the wavelet transform operation and performing 0.33% of entropy coding operation and parts of the bit stream formation operation reduce the overall time to less than 10% of re-encoding the entire image.

In case of higher resolution images, the same analysis still applies. In fact, significant gain in processing time will be obtained since the LL subband will likely be an even lesser fraction of the entire image. Moreover, the bit stream formation operation will take less computational power. The changes required in the bit stream formation operation as a result of this operation are described below with reference to FIG. 8, which illustrates schematically an operational sequence for LL subband modification according to an embodiment of the present invention.

Figure 8:
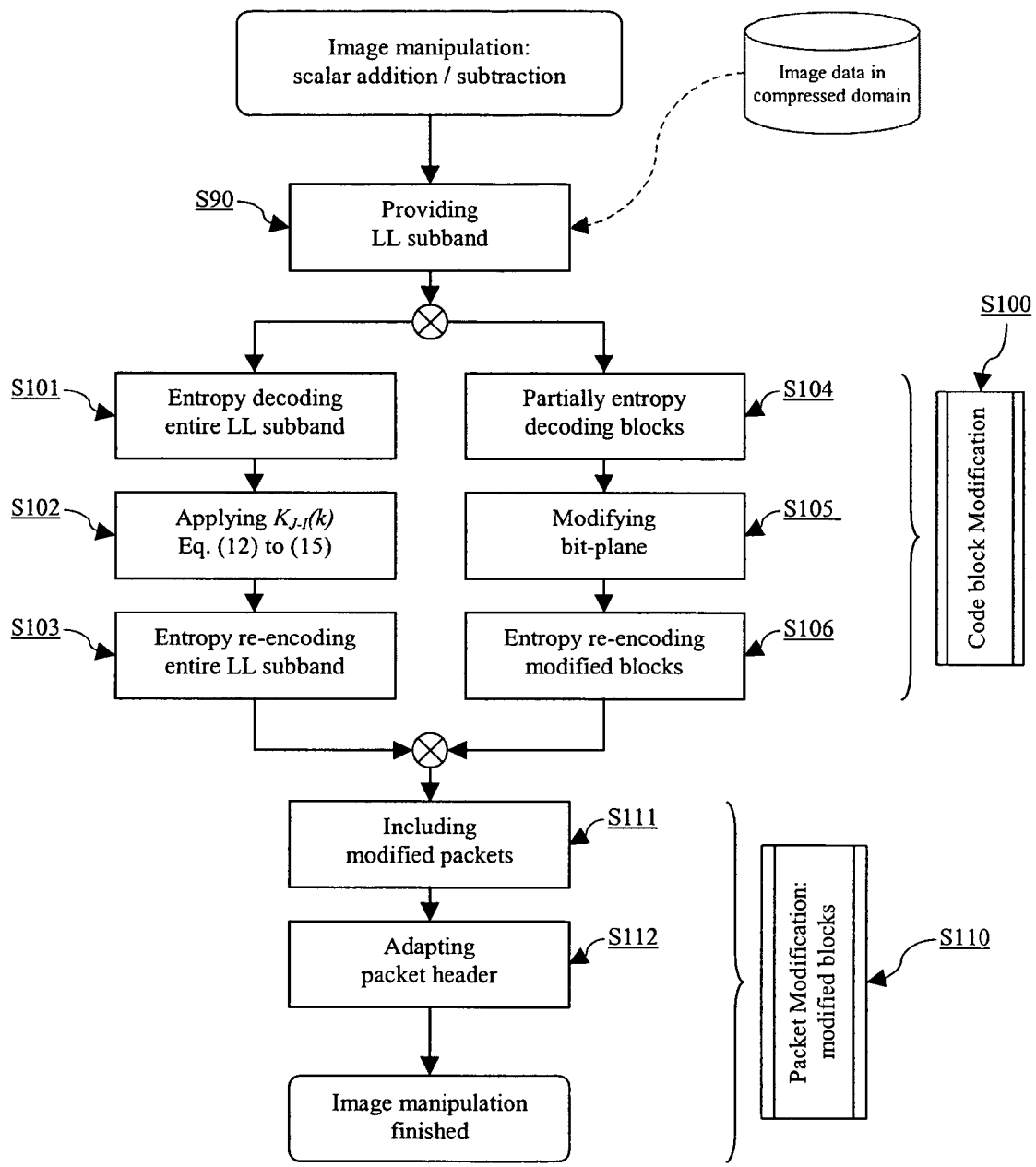
FIG. 8 illustrates schematically an operational sequence of image manipulation by scalar summation/subtraction according to an embodiment of the present invention.

With reference to FIG. 8, in an operation S90, the LL subband of the digital image to be modified is provided.

All the code blocks in the LL subband have to be re-encoded, i.e. first sub-operation S100. There are two possibilities to re-encode the LL subband. The first possibility is illustrated in a first branch of the illustrated operational sequence including operations S101, S102, and S103, whereas the second possibility is illustrated in a second branch of the illustrated operational sequence including operations S104, S105, and S106.

With reference to operations of the first branch, the entire LL subband is re-encoded. The LL subband does not require any inverse wavelet transform.

The decompressed data can be decoded and placed in the subband after application of the scalar addition (or subtraction) in accordance with equations (12) to (15). Note that the $K_{J-1}(k)$ representing the DC shift value may be a positive or negative value.

Figure 9:
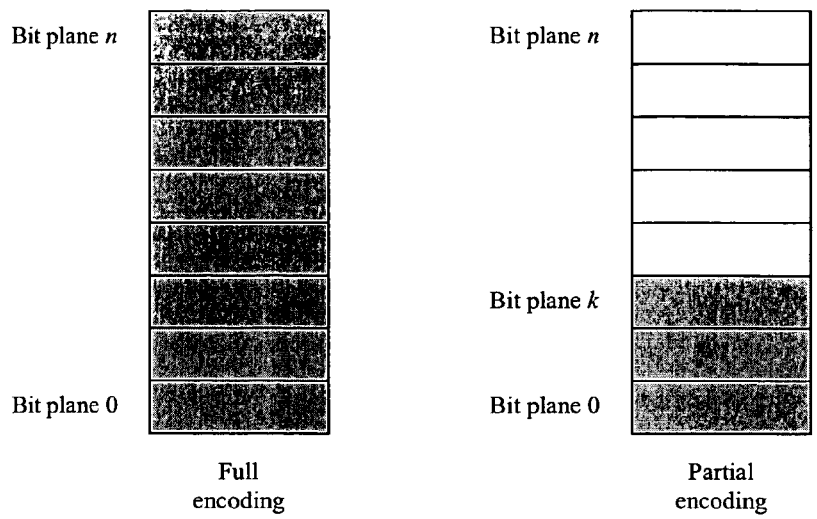
FIG. 9 illustrates schematically bit-plane codings of the LL subband according to an embodiment of the present invention.

With reference to operations of the second branch, the LL subband is partially re-encoded by decoding parts of the blocks and re-encoding them. The $K_{J-1}(k)$ representing the DC shift value to be added or subtracted may start from a bit-plane k as shown in FIG. 9. When adjusting the brightness, the DC shift value to be added or subtracted is usually a fraction of the original sample value. Therefore only the k+1 last significant bit-planes will be modified on the basis of the equations (12) to (15). All the first msb−k, (msb designates the most significant bit) will remain the same. Consequently, only those bit-planes, which are considered for modification, i.e. the k+1 last significant bit-planes, may be decoded. manipulated and re-encoded, which is also designated as partial decoding. Otherwise, i.e. the DC shift factor is not a fraction of the original sample value, the calculation has to be performed in accordance with equation (12) to (15) as illustrated in the first branch described above. In order to further increase the encoding speed of the JPEG 2000 standard or any other subband based encoder, optional arithmetic encoding can be omitted and instead the k bit-planes are sent in raw bits, at the expense of a slight degradation in compression performance.

All the packets comprising the modified blocks need to be changed, in a second sub-operation S110. The compressed data belonging to these blocks is included and the packet headers are altered, cf. operations S111, and S112.

In an operation S124, header information has to be updated due to the data inclusion. The following operation relate to the required packet header modification in more detail.

The "include/not include" bit at the packet header: If the modified block is in a packet in the LL subband, so that at a certain bit-plane it becomes significant (or insignificant) whereas it was not significant (or insignificant) in the original bit stream, the inclusion bit has to be modified.

The code block inclusion information (coded in tag-trees) has to be modified.

The number of empty bit-planes in the modified code-blocks needs updating.

The code-block length will be changed since the brightness adjustment modifies the compressed data.

The changes in the packet headers are very low in complexity. The JPEG 2000 standard offers the random access feature that allows the application introducing these effects to access only those packets that need to be modified in the bit stream. Nevertheless, if the application still wants to perform a new rate distortion optimization, it can do so with low complexity. It can be estimated that these changes are equivalent to approximately 5% of the encoding time in a worst case scenario. Acceleration by approximately factor 20 can be therefore offered.

For grayscale images, brightness adjustment is applied on the single component image itself. For color images, brightness adjustment is only applied in the luminance component of the image. The chrominance components need not be changed.

It should be noted that the approximation can be improved by extending the application of the $K_{J-1}(k)$ representing the DC shift value to further subbands as defined in equations (12) to (15).

Contrast Adjustment—Scalar Multiplication/Division

Figure 10:
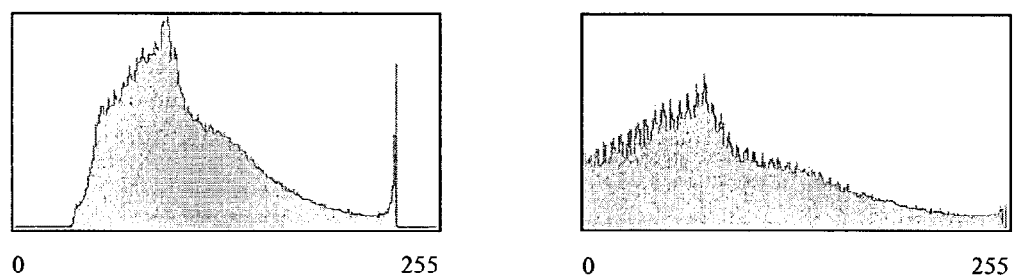
FIG. 10 illustrates schematically shifts in histogram diagrams of an image subjected to contrast enhancements according to an embodiment of the present invention.

In contrast manipulation, the operation is based on stretching/contracting the histogram of the image. An exemplary contrast manipulation is shown in FIG. 10. The histogram of an image represents the frequency of occurrence of the gray levels in the image. Modeling the histogram to a certain property allows achieving the desired effects.

Let p(I) represent the histogram of an image I(n,m). Then p(I) represents the number of pixels in I(n,m) that have intensity $i \in [0,255]$. In view of histogram modification, an image $I_p(n,m)$ is to be generated that has a desired histogram $p_d(I_p)$. This is achieved by finding a function/transformation that will map p(I) to $p_d(I_p)$ to obtain an image $I_p(n,m)$ from I(n,m).

Figure 11:
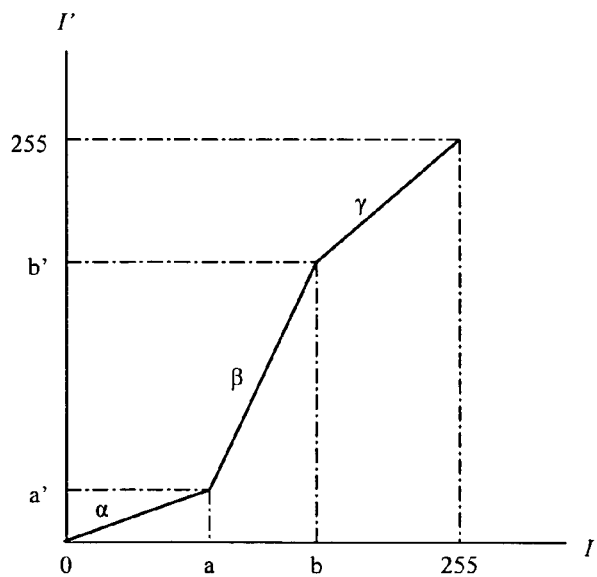
FIG. 11 illustrates schematically an exemplary contrast stretching transformation according to an embodiment of the present invention.

A popular linear method of applying contrast adjustment is to apply the following transformation on the luminance intensity of the image (cf. FIG. 11):

$$I'_{(n,m)} = \begin{cases} \alpha \cdot I_{(n,m)}, & 0 \leq I_{(n,m)} < a \\ \beta \cdot (I_{(n,m)} - a) + a', & a \leq I_{(n,m)} < b \\ \gamma \cdot (I_{(n,m)} - b) + b', & 0 \leq I_{(n,m)} < L \end{cases} \quad (16)$$

where L=255, a=[L*⅓], b=[L*⅔], typically. The parameters α, β and γ correspond to the dark regions, mid regions and bright regions of the image, respectively, and determine the relative contrast adjustment in the image. For contrast stretching, α>1, β>1, γ>1, while for contrast contraction, α<1, β<1, γ<1. Hence, it can be seen that contrast adjustment can be applied by simply scaling the luminance intensity of the pixels by applying appropriate factor(s).

An even simpler method of contrast adjustment is to use a single contrast adjustment factor λ for the entire image. If η is the average of the luminance intensities of the pixels of the image, then:

$$I'_{(n,m)} = \lambda \cdot (I_{(n,m)} - \eta) + \eta \quad (17)$$

The analysis will follow closely to the one done above for brightness operation. The contrast adjustment equation in spatial domain is given by:

$$I'(k) = \lambda \cdot (I(k) - \eta) + \eta$$

$$I'(k) = \lambda \cdot I(k) - \eta(\lambda + 1)$$

$$I'(k) = \lambda \cdot I(k) + K_J \quad (18)$$

where $K_J = -\eta(\lambda + 1)$.

where the constant $K_J$ is applied at level J of the image (original spatial resolution). Using the prime (') symbol to signify the signal that has undergone the contrast operation, the corresponding contrast operation in the wavelet domain at the different scales j, in terms of the scaling and wavelet coefficients (the discrete wavelet transform), is given by:

At scale j=J:
Using equations (5) and (18), $$c'_J(k) = I'(k) = \lambda \cdot I(k) + K_J = \lambda \cdot c_J(k) + K_J \quad (19)$$

At scale j=J−1:

$$c'_{J-1}(k) = \sum_m h(m - 2k) c'_J(m) \quad (20)$$

$$c'_{J-1}(k) = \sum_m h(m - 2k)[\lambda \cdot c_J(m) + K_J]$$

$$c'_{J-1}(k) = \lambda \cdot \sum_m h(m - 2k) c_J(m) + \sum_m h(m - 2k) K_J$$

$$c'_{J-1}(k) = \lambda \cdot c_{J-1}(k) + K_J \sum_m h(m - 2k)$$

$$c'_{J-1}(k) = \lambda \cdot c_{J-1}(k) + K_{J-1}(k)$$

where $$K_{J-1}(k) = K_J \sum_m h(m - 2k)$$

At scale j=J−2:

$$c'_{J-2}(k) = \sum_m h(m - 2k) c'_{J-1}(m) \quad (21)$$

$$c'_{J-2}(k) = \sum_m h(m - 2k)[\lambda \cdot c_{J-1}(m) + K_{J-1}(k)]$$

$$c'_{J-2}(k) = \lambda \cdot \sum_m h(m - 2k) c_{J-1}(m) + \sum_m h(m - 2k) K_{J-1}(k)$$

$$c'_{J-2}(k) = \lambda \cdot c_{J-2}(k) + K_{J-1}(k) \sum_m h(m - 2k)$$

$$c'_{J-2}(k) = \lambda \cdot c_{J-2}(k) + K_{J-2}(k);$$

where $$K_{J-2}(k) = K_{J-1}(k) \sum_m h(m - 2k) = K_J \left( \sum_m h(m - 2k) \right)^2$$

Proceeding in this fashion, for a general scale j=J−l, the scaling coefficients are given by:

$$c'_{J-l}(k) = \lambda \cdot c_{J-l}(k) + K_{J-l}(k) \quad (22)$$

where (23)

$$K_{J-l}(k) = K_J \left( \sum_m h(m - 2k) \right)^l = -\eta(\lambda + 1) \left( \sum_m h(m - 2k) \right)^l$$

In other words, the contrast operation in the wavelet domain can be performed by scaling the scaling coefficients $c_j(k)$ by the contrast scaling factor λ and adding the term $K_{J-1}(k)$ to it. The term h(k) signifies the scaling filter.

A similar analysis can be done for evaluating the wavelet coefficients $d_j(k)$. For the sake of brevity and avoiding repetitiveness (since the analysis is very similar), we will not list all the steps of the analysis but will only provide the end result. For a general scale, j=J−1, the wavelet coefficients are given by:

$$d'_{J-l}(k) = \lambda \cdot d_{J-l}(k) + K_{J-l}(k) \quad (24)$$

where (25)

$$K_{J-l}(k) = K_J \left( \sum_m h'(m - 2k) \right)^l = -\eta(\lambda + 1) \left( \sum_m h'(m - 2k) \right)^l$$

In other words, the contrast operation in the wavelet domain can be performed by scaling the wavelet coefficients $d_j(k)$ by the contrast scaling factor λ and adding the term $K_{J-1}(k)$ to it. The term h'(k) signifies the wavelet filter.

As can be seen from the above equations, the wavelet transformed coefficients change in all the subbands from the original wavelet transformed image. However, since most of the energy is concentrated in the LL subband of the transformed image, it is sufficient to apply this change only in the LL subband to get a first good approximation of the contrast operation in the spatial domain. Thus, the multiplication of the contrast factor λ in the spatial domain is in fact approximately equivalent to its modification in the base band (LL subband) of the wavelet domain. Therefore, we can apply the contrast adjustment in the wavelet domain instead of applying it in the spatial domain. The gain in performance here is approximately 10 to 15% as explained previously.

The approximate change here occurs in the LL subband only. It is therefore not necessary to re-encode the other sub-bands. The JPEG 2000 standard and possibly other subband coder and in particular wavelet transform encoders, which do not use any inter-bands correlation, allow us to keep the same code streams for the other bands. Therefore a significant improvement in the performance of the operation can be obtained by merely modifying the compressed data of the LL subband. Again, similar arguments apply here as with the brightness adjustment approach, as far as implementation and complexity issues are concerned. Therefore, the performance of the contrast adjustment operation can be significantly improved by only modifying the compressed data of the LL subband.

Figure 12:
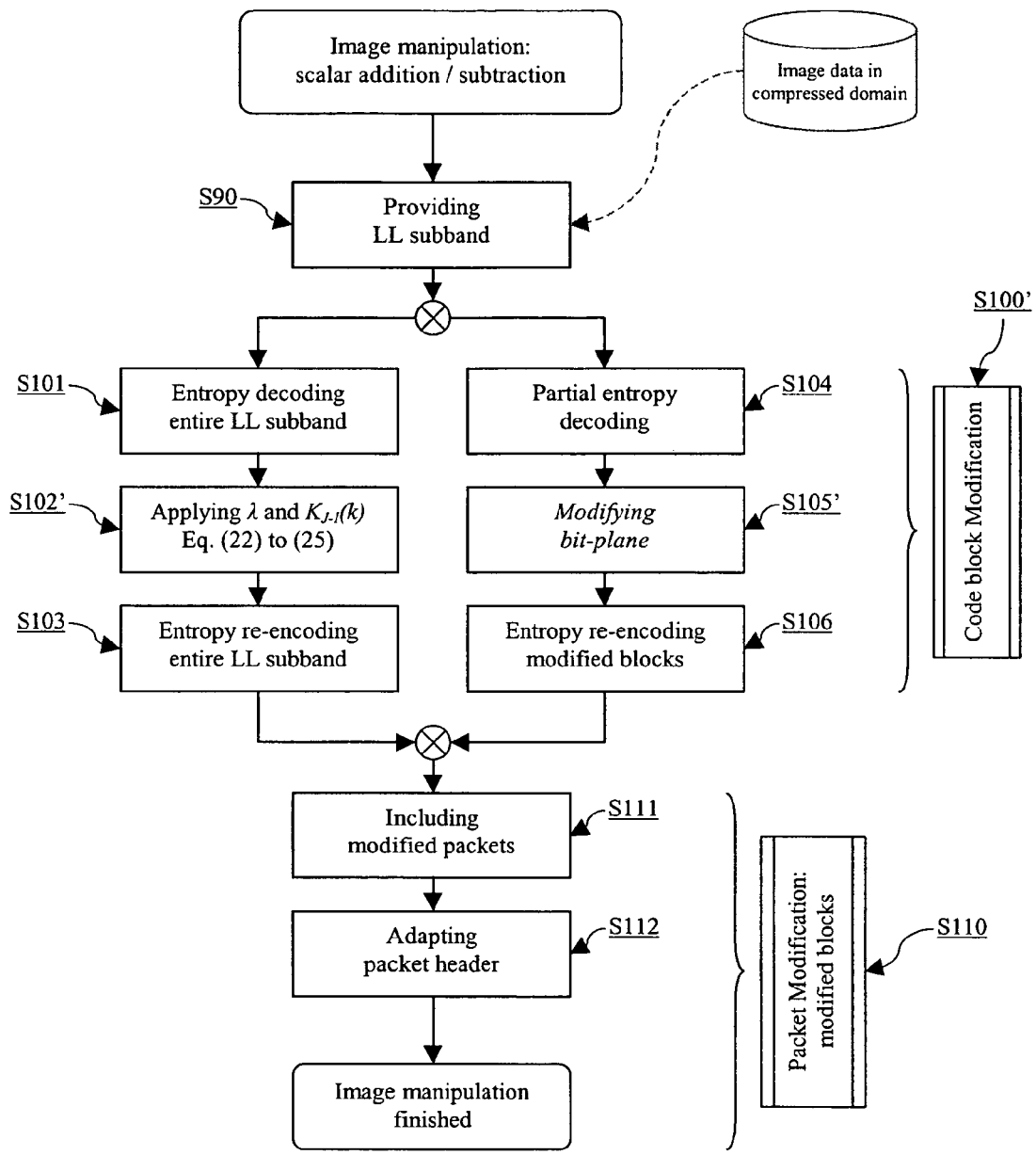
FIG. 12 illustrates schematically an operation sequence of image manipulation by scalar multiplication/division according to an embodiment of the present invention.

The complexity analysis and implementation aspects of contrast adjustment follow an approach very similar to the brightness adjustment approach, and for the sake of brevity, will not be repeated here in detail. FIG. 12 illustrates schematically an operational sequence for LL subband modification according to an embodiment of the present invention With reference to FIG. 12, in an operation S90, the LL subband of the digital image to be modified is provided.

All the code blocks in the LL subband have to be re-encoded, i.e. first sub-operation S100'. There are two possibilities to re-encode the LL subband. The first possibility is illustrated in a first branch of the illustrated operational sequence including operations S101, S102', and S103, whereas the second possibility is illustrated in a second branch of the illustrated operational sequence including operations S104, S105', and S106.

With reference to operations of the first branch, the entire LL subband is re-encoded. The LL subband does not require any inverse wavelet transform. The decompressed data can be decoded and placed in the subband after application of the scalar multiplication (or division) and addition (or subtraction) in accordance with equations (22) to (25). Note that the factor $\lambda$ may be greater or small than one (equal to a multiplication operation and a division operation, respectively) and the $K_{J-1}(k)$ representing a shift value may be a positive or negative value.

With reference to operations of the second branch, the LL subband is partially re-encoded by decoding parts of the blocks and re-encoding them. Under certain circumstances, i.e. depending on the factor $\lambda$ and the summand $K_{J-1}(k)$ the modification may start from a bit-plane k comparable with the discussion given above with respect to operation S105. Therefore only the k+1 last significant bit-planes will be modified on the basis of the equations (22) to (25). All the first msb–k, (msb designates the most significant bit) will remain the same. Consequently, only those bit-planes, which are considered for modification, i.e. the k+1 last significant bit-planes, may be decoded. manipulated and re-encoded, which is designated also as partial decoding. Otherwise, the calculation has to be performed in accordance with equation (22) to (25) as illustrated in the first branch described above. In order to further increase the encoding speed of the JPEG 2000 standard as well as of any wavelet transform base encoder, optional arithmetic encoding can be omitted and instead the k bit-planes are sent in raw bits, at the expense of a slight degradation in compression performance.

All the packets comprising the modified blocks need to be changed, in the second sub-operation S110. The compressed data belonging to these blocks is included and the packet headers are altered, cf. operations S111, and S112.

In another operation, header information has to be updated due to the data inclusion. The following operations relate to the required packet header modification in more detail.

The "include/not include" bit at the packet header: If the modified block is in a packet in the LL subband, so that at a certain bit-plane it becomes significant (or insignificant) whereas it was not significant (or insignificant) in the original bit stream, the inclusion bit has to be modified.

The code block inclusion information (coded in tag-trees) has to be modified.

The number of empty bit-planes in the modified code-blocks needs updating.

The code-block length will be change since the brightness adjustment modifies the compressed data.

It should be noted that the approximation can be improved by extending the application of the $K_{J-1}(k)$ representing the linear factor to further subbands as defined in equations (22) to (25).

Generalized Linear Filtering

A generalized N-tap linear filtering on an input image I(n,m) to give the filtered image I'(n,m) can be written as:

$$I'(l) = \sum_{l=-N/2}^{N/2} f(k) \cdot I(l-k) \quad (26)$$

where the index l is related to the index pair (n,m) by an appropriate transformation $\Gamma$, i.e., $$l = \Gamma(n,m). \quad (27)$$

The N scaling parameters $f(k)$ are the filter coefficients of the N-tap filter. Equation (26) is a generalized form of linear filtering of still images and can be used to describe a wide variety linear image filtering operations. Some of the most common of these are smoothening (low pass filtering), sharpening (high pass filtering), averaging (arithmetic mean filter), and others.

From the discussion on brightness and contrast adjustment, we see that both addition (or subtraction) and multiplication (or scaling) of pixel coefficients of a still JPEG 2000 encoded image is possible in the compressed domain. From equation (26), it can be seen that generalized linear filtering is a simple extension of these two basic operations, i.e., it can be linearly decomposed into a finite number of addition and multiplication operations to achieve the desired results. Hence, by the results on brightness and contrast adjustment and the superposition principle of linear operations, any linear image processing operation can be performed in the compressed domain using the inventive concept. In particular, two important filtering operations will be discussed below:

Sharpening Operation

Sharpening is an image processing operation whereby the edges in the image are enhanced so that the image looks sharper than before. Sharpening an image is analogous to enhancing the high frequency information (such as edges) of the image. The wavelet coefficients in the high frequency subbands of the wavelet-transformed image contain information related to edges. Hence, the coefficients in the high frequency subbands have to be enhanced. Assume an image that has three levels of wavelet decomposition (cf. FIG. 4). The coefficients at level 1 of the transformed image exhibit the strongest high frequency content in the image, while the coefficients in the next level (level 2) exhibit the next strongest high frequency content, and so on. Hence, in order to enhance the high frequency information, it is imperative that the coefficients in level 1 have to be enhanced the most. Enhancing a coefficient can be done by multiplying it by a constant factor $\lambda > 1$.

Depending on the strength of the desired sharpening operation, the coefficients in the next level subbands can be enhanced too. If a mild sharpening operation is required, only the coefficients of subbands of level 1 will have to be enhanced. If stronger sharpening is required, then the coefficients in the next level (level 2) subbands will be enhanced too, and so on, until we reach the highest level of the wavelet pyramid, where we can enhance the high frequency subbands of that level. However, the LL subband of the transformed image is not altered, since it contains only the low frequency content.

The subbands that have their coefficients changed need to be entropy encoded as explained before in previous sections. Hence, the gain in acceleration depends on the number of subbands that have to be altered, which in turn depends on the strength of the sharpening operation desired.

Smoothing Operation

Smoothing an image is analogous to suppressing the high frequency content of the image. The wavelet coefficients in the high frequency subbands of the wavelet transformed image contain information related to edges and similar high frequency information. By suppressing this high frequency information, the edges can be smoothed out. Hence, the smoothening operation in the JPEG 2000 standard can be achieved by suppressing the coefficients in the high frequency subbands. Assume an image that has three levels of wavelet decomposition (cf. FIG. 4). The coefficients at level 1 of the transformed image exhibit the strongest high frequency content in the image, while the coefficients in the next level (level 2) exhibit the next strongest high frequency content, and so on. Hence, in order to suppress the high frequency information, it is imperative that the coefficients in level 1 be suppressed the most. So, the first step is to suppress coefficients of level 1 equal to zero.

Depending on the strength of the desired smoothening operation, the coefficients in the next level subbands can be suppressed too. If a mild smoothening operation is required, only the coefficients of subbands of level 1 will have to be suppressed. If stronger smoothening is required, then the coefficients in the next level (level 2) subbands will be suppressed too, and so on, until we reach the highest level of the wavelet pyramid, where we can suppress the high frequency subbands of that level. However, the LL subband of the transformed image is not altered, since it contains only the low frequency content.

The subbands that have their coefficients changed need to be entropy coded as explained before in previous sections. Hence, the gain in acceleration depends on the number of subbands that are altered, which in turn depends on the strength of the smoothening operation desired.

Implementation Embodiment

Figure 13:
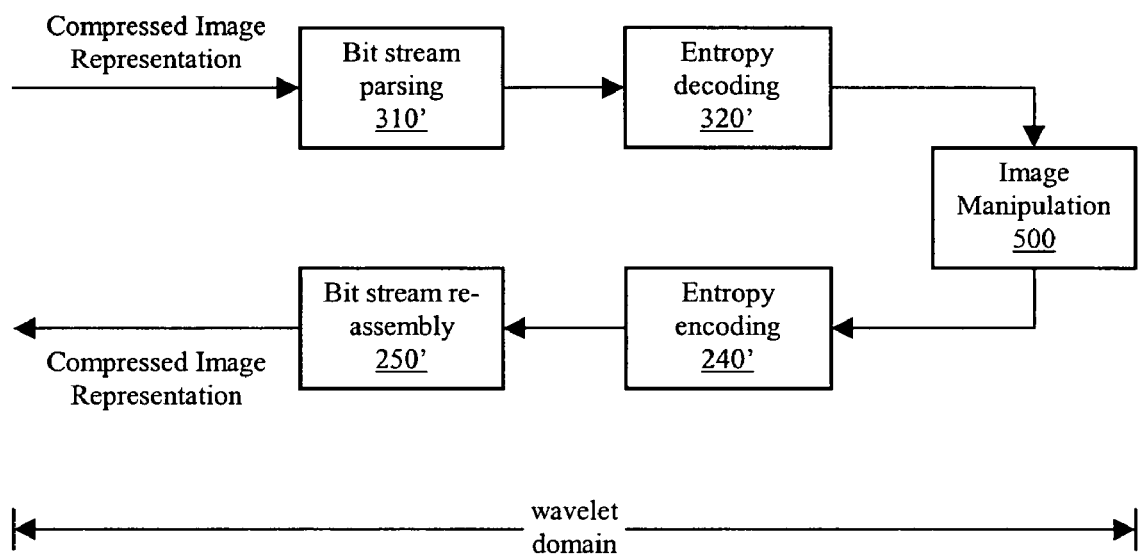
FIG. 13 illustrates an exemplary implementation of an image manipulation module in accordance with an embodiment of the present invention.

With reference to FIG. 13, an exemplary implementation of the methodology described above in detail is presented. The implementation may be part of the JPEG 2000 encoder/decoder implementation shown in FIG. 3 and described above with reference thereto in detail. In accordance with the inventive concept, the image data in the compressed domain (i.e. encoded domain or compressed image representation) is supplied to a bit-stream parsing module 310', which may be the bit-stream parsing module 310 of FIG. 3 having the specific required functionality as defined with reference to operations S90 of FIGS. 8 and 12 to enable provision of the LL subband of the image data in compressed domain. Then, the LL subband image data is fed to the entropy decoder 320' which may be the entropy decoder 320 of FIG. 3 having the specific required functionality as defined with reference to operations S100 and S100' of FIGS. 8 and 12. The image manipulation serves for applying equations (12) to (15) and/or (22) to (25) (cf. operations 102 and 105 as well as 102' and 105' of FIGS. 8 and 12, respectively).

After manipulation 500, the modified image data in the compressed domain is fed to the to the entropy encoder 240' which may be the bit-stream parsing module 240 of FIG. 3 having the specific required functionality as defined with reference to operations S100 and S100' of FIGS. 8 and 12. Finally, the modified image data is re-included into the image data for forming compressed image representation of the modified image. The bit-stream assembly module 250' servers for the re-assembly, wherein the bit-stream assembly module 250' may be the bit-stream assembly module 250 of FIG. 3 having the specific required functionality as defined with reference to operation S110 of FIGS. 8 and 12.

The modules illustrated in FIG. 13 are preferably implemented in an image processing module, such as one of those decried with reference to FIG. 1a or 1b.

Those skilled in the art will appreciate that although the present invention has been described in detail with reference to the JPEG 2000 standard, which operates on the basis of discrete wavelet transform (DWT), the inventive concept is applicable with any subband based encoding methodology and especially is operable with wavelet transform encoding. Consequently, the present invention is not to be understood to be limited to the JPEG 2000 standard and discrete wavelet transform encoders/decoders, respectively.

It should be noted that the modules, components, and functionalities, which are described in conjunction with the embodiments of the present invention and which are to be included in the CE device with image capturing capability according to an embodiment of the invention may be constituted by a data processing unit, such as a microprocessor or a microcontroller, which may be comprised by the portable CE device. Further, the modules, components, and functionalities may be constituted by a code section for executing on one or a plurality of data processing units (microprocessors, microcontrollers or application specific integrated circuits (ASIC)) containing instructions for carrying out the necessary processing operations for performing functions and operations. Alternatively or additionally, the modules, components, and functionalities or partial functions thereof may be implemented on the basis of one or more hardware modules such as application specific integrated circuits (ASIC). The implementation of the inventive concept is not limited to any specific implementation including software and/or hardware implementation.

Several features and aspects of the present invention have been illustrated and described in detail with reference to particular embodiments by the way of example only, and not by the way of limitation. Those skilled in the art will appreciate that alternative implementations and various modifications to the disclosed embodiments are within the scope and contemplation of the invention. Therefore, it is intended that the invention be considered as limited only by the scope of the appended claims.

The invention claimed is:

1. Method, comprising:

at a consumer electronic device, providing compressed image data in a compressed domain obtained from image data in a spatial domain by a subband encoder, in particular based on a wavelet transform;

at the consumer electronic device, providing a transformed linear function F(k) in the compressed domain of a linear function $f(k)$ defined in the spatial domain, wherein the transformed linear function F(k) is obtainable by transforming the linear function $f(k)$ from the spatial domain into the compressed domain, wherein the linear function $f(k)$ is composed of at least one out of a group comprising at least one linear offset K and at least one linear scaling factor λ, wherein the linear function $f(k)$ is applicable to the image data in the spatial domain to obtain modified image data in the spatial domain; and at the comsumer electronic device, applying the transformed linear function F(k) to a defined number of subbands of the compressed image data for modifying the image data in the compressed domain resulting in modified subbands.

2. Method according to claim 1, wherein the transform of the linear function $f(k)$ into the compressed domain at the consumer electronic device comprises:

transforming the at least one linear offset K into the compressed domain resulting in at least one transformed offset value $K_{J-1}(k)$.

3. Method according to claim 2, wherein the at least one transformed offset value $K_{J-1}(k)$ represents a constant linear offset to be applied to the compressed image data in the compressed domain at a defined spatial resolution level J.

4. Method according to claim 2, wherein code-blocks of the modified subbands are all re-encoded at the consumer electronic device, by entropy decoding the defined number of subbands, applying the transformed linear function F(K) to the code-blocks of the defined number of subbands resulting in modified subbands, wherein the at least one transformed offset value $K_{J-1}(k)$ is added to each value of the code-blocks and the at least one linear scaling factor λ is multiplied to each value of the code-blocks; and entropy re-encoding the modified subbands containing the code-blocks.

5. Method according to claim 4, wherein the code-blocks of the modified subbands are partially re-encoded at the consumer electronic device by entropy decoding a defined number (msb-k) of bit-planes of the code-blocks, and applying the transformed offset value $K_{J-1}(k)$ to the bit-planes, where the transformed offset value $K_{J-1}(k)$ represents a fraction of an original sample value.

6. Method according to claim 1, wherein the linear function $f(k)$ allows for defining a linear filter function to be applied to the image data, the linear filter function including in particular brightness enhancement or, contrast enhancement, or both.

7. Method according to claim 1, comprising:

at the consumer electronic device, providing a generalized function applicable to the image data in the spatial domain, and at the consumer electronic device, linearly decomposing the generalized function into the linear function $f(k)$ into at least one out of a group comprising the at least one linear offset K and the at least one linear scaling factor λ.

8. Method according to claim 7, wherein the linearly decomposing comprises:

generating a linearly approximated function based on the generalized function.

9. Method according to claim 2, further comprising:

at the consumer electronic device, adapting packet headers of packets including the code-blocks subjected to the application of the transformed linear function F(k).

10. Method according to claim 1, wherein the transformed linear function F(k) is applied to at least a first level of a base-band comprising a subband (LL) representing high frequency information of the image data.

11. Method according to claim 7, wherein the generalized function allows at least for sharpening filtering and smoothing filtering.

12. A computer readable medium having stored thereon computer-executable components comprising:

a code section for providing compressed image data in a compressed domain obtained from image data in a spatial domain by a subband encoder, in particular based on a wavelet transform;

a code section for providing a transformed linear function F(k) in the compressed domain of a linear function $f(k)$ defined in the spatial domain, wherein the transformed linear function F(k) is obtainable by transforming the linear function $f(k)$ from the spatial domain into the compressed domain, wherein the linear function $f(k)$ is composed of at least one out of a group comprising at least one linear offset K and at least one linear scaling factor λ, wherein the linear function $f(k)$ is applicable to the image data in the spatial domain to obtain modified image data in the spatial domain; and a code section for applying the transformed linear function F(k) to a defined number of subbands of the compressed image data for modifying the image data in the compressed domain resulting in modified subbands.

13. Computer readable medium according to claim 12, wherein the transform of the linear function $f(k)$ into the compressed domain comprises:

a code section for transforming the at least one linear offset K into the compressed domain resulting in at least one transformed offset value $K_{J-1}(k)$.

14. Computer readable medium according to claim 13, wherein the at least one transformed offset value $K_{J-1}(k)$ represents a constant linear offset to be applied to the compressed image data in the compressed domain at a defined spatial resolution level J.

15. Computer readable medium according to claim 13, wherein code-blocks of the modified subbands are all re-encoded by a code section for entropy decoding the defined number of subbands, a code section for applying the transformed linear function F(k) to the code-blocks of the defined number of subbands resulting in modified subbands, wherein the at least one transformed offset value $K_{J-1}(k)$ is added to each value of the code-blocks and the at least one linear scaling factor λ is multiplied to each value of the code-blocks; and a code section for entropy re-encoding the modified subbands containing the code-blocks.

16. Computer readable medium according to claim 15, wherein the code-blocks of the modified subbands are partially re-encoded by a code section for entropy decoding a defined number (msb-k) of bit-planes of the code-blocks, and a code section for applying the transformed offset value $K_{J-1}(k)$ to the bit-planes, where the transformed offset value $K_{J-1}(k)$ represents a fraction of an original sample value.

17. Computer readable medium according to claim 12, further comprising:

a code section for adapting packet headers of packets including the code-blocks subjected to the application of the transformed linear function F(k).

18. Computer readable medium according to claim 12, wherein the linear function $f(k)$ allows for defining a linear filter function to be applied to the image data, the linear filter function including in particular brightness enhancement or, contrast enhancement, or both.

19. Computer readable medium according to claim 12, further comprising:
a code section for providing a generalized function applicable to the image data in the spatial domain, and
a code section for linearly decomposing the generalized function into the linear function $f(k)$ into at least one out of a group comprising the at least one linear offset K and the at least one linear scaling factor $\lambda$.

20. Computer readable medium according to claim 19, wherein the linearly decomposing comprises:
a code section for generating a linearly approximated function based on the generalized function.

21. Computer readable medium according to claim 19, wherein the transformed linear function F(k) is applied to at least a first level of a base-band comprising a subband (LL) representing high frequency information of the image data.

22. Computer readable medium according to claim 19, wherein the generalized function allows at least for sharpening filtering and smoothing filtering.

23. Consumer electronic device comprising:
a subband encoder, in particular based on a wavelet transform, for transforming image data in a spatial domain into compressed data image in a compressed, wherein a transformed linear function F(k) in the compressed domain of a linear function $f(k)$ defined in the spatial domain, wherein the transformed linear function F(k) is obtainable by transforming the linear function $f(k)$ from the spatial domain into the compressed domain, wherein the linear function $f(k)$ is composed of at least one out of a group comprising at least one linear offset K and at least one linear scaling factor $\lambda$; wherein the linear function $f(k)$ is applicable to the image data in the spatial domain to obtain modified image data in the spatial domain;
an image manipulation module adapted to apply the transformed linear function F(k) to a defined number of subbands of the compressed image data for modifying the image data in the compressed domain resulting in modified subbands.

24. Device according to claim 23, wherein the image manipulation module adapted to transform the at least one linear offset K into the compressed domain resulting in at least one transformed offset value $K_{J-j}(k)$.

25. Device according to claim 24, wherein the at least one transformed offset value $K_{J-j}(k)$ represents a constant linear offset to be applied to the compressed image data in the compressed domain at a defined spatial resolution level J.

26. Device according to claim 24, wherein the image manipulation module operates on code-blocks of the modified subbands and is adapted to re-encode all the code-blocks wherein
an entropy decoder is adapted to decode the defined number of subbands,
the image manipulation module is adapted to apply the transformed linear filter function F(k) to the code-blocks of the defined number of subbands resulting in modified subbands, wherein at least one transformed offset value $K_{J-j}(k)$ is added to the each value of the code-blocks and the at least one linear scaling factor $\lambda$ is multiplied to the each value of the code-blocks; and
an entropy encoder is adapted to re-encode the modified subbands containing the code-blocks.

27. Device according to claim 24, wherein the image manipulation module operates on code-blocks of the modified subbands and is adapted to partially re-encode the code-blocks wherein
an entropy decoder is adapted to decode a defined number (msb-k) of bit-planes of the code-blocks; and
the image manipulation module is adapted to apply the transformed offset value $K_{J-j}(k)$ to the bit-planes, the shift value $K_{J-j}(k)$ representing a fraction of an original sample value.

28. Device according to claim 24, wherein the image manipulation module is adapted to update packet headers of packets including code-blocks subjected to the application of the transformed linear function F(k).

29. Device according to claim 24, wherein the function $f(k)$ allows for defining a linear filter function to be applied to the image data, the linear filter function including in particular brightness enhancement, or contrast enhancement, or both.

30. Device according to claim 24, comprising a generalized function applicable to the image data in the spatial domain, wherein the image manipulation module adapted to linearly decompose the generalized function into the linear function $f(k)$ into at least one out of a group comprising the at least one linear offset K and the at least one linear scaling factor $\lambda$.

31. Device according to claim 24, wherein the linearly decomposing comprises:
generating a linearly approximated function based on the generalized function.

32. Device according to 24, wherein the transformed linear filter function F(k) is applied to at least a first level of a base-band comprising a subband (LL) representing high frequency information of the image data.

33. Device according to claim 32, wherein the generalized filter $f(k)$ function allows at least for sharpening filtering and smoothing filtering.

34. A consumer electronic device comprising:
means for transforming image data in a spatial domain into compressed data image in a compressed domain, in particular based on a wavelet transform, wherein a transformed linear function F(k) in the compressed domain of a linear function $f(k)$ defined in the spatial domain, wherein the transformed linear function F(k) is obtainable by transforming the linear function $f(k)$ from the spatial domain into the compressed domain, wherein the linear function $f(k)$ is composed of at least one out of a group comprising at least one linear offset K and at least one linear scaling factor $\lambda$; wherein the linear function $f(k)$ is applicable to the image data in the spatial domain to obtain modified image data in the spatial domain;
means for applying the transformed linear function F(k) to a defined number of subbands of the compressed image data for modifying the image data in the compressed domain resulting in modified subbands.

* * * * *

UNITED STATES PATENT AND TRADEMARK OFFICE
CERTIFICATE OF CORRECTION

PATENT NO. : 7,583,844 B2  
APPLICATION NO. : 11/077989  
DATED : September 1, 2009  
INVENTOR(S) : Chebil Fehmi et al.

Page 1 of 1

It is certified that error appears in the above-identified patent and that said Letters Patent is hereby corrected as shown below:

In column 21, line 33 (claim 4, line 5) "F(K)" should be --F(k)--.

Signed and Sealed this

Twenty-fourth Day of November, 2009

David J. Kappos  
*Director of the United States Patent and Trademark Office*